(12) United States Patent
Watanabe et al.

(10) Patent No.: US 9,310,878 B2
(45) Date of Patent: Apr. 12, 2016

(54) POWER GATED AND VOLTAGE BIASED MEMORY CIRCUIT FOR REDUCING POWER

(71) Applicant: FUJITSU LIMITED, Kawasaki-shi, Kanagawa (JP)

(72) Inventors: Yasuhiro Watanabe, Kawasaki (JP); Kentaro Kawakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 259 days.

(21) Appl. No.: 13/939,344

(22) Filed: Jul. 11, 2013

(65) Prior Publication Data

US 2014/0068305 A1    Mar. 6, 2014

(30) Foreign Application Priority Data

Sep. 6, 2012 (JP) .................. 2012-196355

(51) Int. Cl.
*G06F 1/32* (2006.01)
(52) U.S. Cl.
CPC .............. *G06F 1/3287* (2013.01); *G06F 1/324* (2013.01); *G06F 1/3296* (2013.01); *Y02B 60/1217* (2013.01); *Y02B 60/1282* (2013.01); *Y02B 60/1285* (2013.01)
(58) Field of Classification Search
CPC ..... G06F 1/3287; G06F 1/3296; G06F 1/324; Y02B 60/1217; Y02B 60/1285; Y02B 60/1282
See application file for complete search history.

(56) References Cited

U.S. PATENT DOCUMENTS

| 5,504,909 A * | 4/1996 | Webster et al. ............... 713/310 |
| 2003/0076705 A1 | 4/2003 | Yamaoka et al. |
| 2004/0010679 A1 * | 1/2004 | Moritz et al. ..................... 713/1 |
| 2008/0191791 A1 | 8/2008 | Nomura et al. |
| 2009/0091372 A1 * | 4/2009 | Chang et al. .................. 327/427 |

(Continued)

FOREIGN PATENT DOCUMENTS

| JP | 4-329663 | 11/1992 |
| JP | 9-212416 | 8/1997 |

(Continued)

OTHER PUBLICATIONS

Jungsoo Kim; Sungjoo Yoo; Chong-Min Kyung, "Program phase and runtime distribution-aware online DVFS for combined Vdd/Vbb scaling," Design, Automation & Test in Europe Conference & Exhibition, 2009. Date '09., vol., No., pp. 417,422, Apr. 20-24, 2009 doi: 10.1109/DATE.2009.5090699.*

(Continued)

*Primary Examiner* — Jaweed A Abbaszadeh
*Assistant Examiner* — Brian J Corcoran
(74) *Attorney, Agent, or Firm* — Staas & Halsey LLP

(57) ABSTRACT

A circuit system includes: a plurality of memory blocks; a power supply circuit configured to supply operating power and substrate power to the plurality of memory blocks; a plurality of first power supply switches configured to control whether or not the operating power is supplied from the power supply circuit to the plurality of memory blocks; and a control circuit configured to control the power supply circuit and the plurality of first power supply switches, wherein the control circuit changes a voltage of the operating power to be supplied by the power supply circuit and a voltage of the substrate power to be supplied by the power supply circuit, based on a state of whether the first power supply switches are in a supplying state or a blocking state.

10 Claims, 9 Drawing Sheets

(56) References Cited

U.S. PATENT DOCUMENTS

| | | | |
|---|---|---|---|
| 2010/0073068 A1* | 3/2010 | Cho et al. | 327/513 |
| 2010/0141330 A1* | 6/2010 | Yang et al. | 327/534 |
| 2013/0173938 A1* | 7/2013 | Yang | 713/300 |

FOREIGN PATENT DOCUMENTS

| | | |
|---|---|---|
| JP | 2000-149561 | 5/2000 |
| JP | 2003-132683 | 5/2003 |
| JP | 2010-519612 | 6/2010 |
| JP | 4835856 | 12/2011 |
| WO | WO 2008/101036 A1 | 8/2008 |

OTHER PUBLICATIONS

Martin, S. M., et al. "Combined Dynamic Voltage Scaling and Adaptive Body Biasing for Lower Power Microprocessors Under Dynamic Workloads." Ieee Acm International Conference on Computer Aided Design (2002): 721-725. British Library Document Supply Centre Inside Serials & Conference Proceedings. Web. Jun. 8, 2015.*

* cited by examiner

POWER GATED AND VOLTAGE BIASED MEMORY CIRCUIT FOR REDUCING POWER

CROSS-REFERENCE TO RELATED APPLICATION

This application is based upon and claims the benefit of priority of the prior Japanese Patent Application No. 2012-196355, filed on Sep. 6, 2012, the entire contents of which are incorporated herein by reference.

FIELD

The embodiments discussed herein are related to a circuit system and a semiconductor device.

BACKGROUND

There is a demand for a reduction in power to be consumed by a circuit system including a logic circuit such as a processor and a memory and a reduction in power to be consumed by a semiconductor device (semiconductor circuit or LSI) provided with the circuit system. Various methods for reducing power to be consumed have been proposed. One of the methods is to stop supply of operating power to a part that does not operate. In this method, when a logic circuit such as a processor does not operate, supply of operating power to the logic circuit is stopped. When the memory does not operate, input and output of data to and from the memory are stopped, and the memory may hold stored data or may not hold the stored data. If the memory does not hold the stored data, supply of operating power is stopped so as to reduce power to be consumed. If the memory holds the stored data, a substrate voltage Vbb (described later) is applied, for example.

Various methods for reducing power to be consumed while achieving requested performance (operating speed) in an operating circuit system have been proposed as well as the aforementioned method for stopping supply of operating power to a part that does not operate. A method for dynamically changing an operating speed (clock frequency) and an operating power supply voltage on the basis of a loaded state of the circuit system so as to reduce power to be consumed has been proposed. In the embodiments described later, an operating speed is a fixed value. The embodiments, however, are applicable to the case where the operating speed is dynamically changed.

Power to be consumed by a semiconductor device (semiconductor circuit) and performance (operating speed) of the semiconductor device depend on a voltage Vdd (hereinafter referred to as operating voltage) of an operating power supply and a transistor threshold voltage Vth. For example, when the operating voltage Vdd is reduced, switching power may be reduced in proportion to the square of the operating voltage Vdd. The reduction in the operating voltage Vdd, however, may cause a reduction of the performance. In order to maintain the performance upon the reduction in the operating voltage Vdd, there is a method for reducing the transistor threshold voltage Vth by controlling a voltage Vbb (hereinafter referred to as substrate voltage) of a substrate power supply. When the transistor threshold voltage Vth is reduced, a sub-threshold leakage current of a transistor increases. The relationship between power to be consumed by the semiconductor circuit and the performance of the semiconductor circuit is a tradeoff relationship. Thus, how to reduce power to be consumed is a problem. Various methods for controlling the voltages Vdd and Vbb on the basis of an operational state of the semiconductor circuit and reducing power to be consumed by the semiconductor circuit have been proposed.

For example, the semiconductor circuit is in an active (operating) state or a standby (sleep) state. In the active state, the semiconductor circuit executes a process. In the standby state, the semiconductor circuit does not execute a process. There is a method for reducing a leakage current in the standby state by reducing an operational frequency (clock frequency), applying the substrate voltage Vbb, and reducing the voltage Vdd in order to cause the semiconductor circuit to become the standby state. Power to be consumed by the semiconductor circuit mainly includes switching power and leakage power. In the active state, the semiconductor circuit operates at an operational frequency for execution of a requested process and the switching power is dominant. In the standby state in which a process is almost not executed, the leakage power is dominant. Thus, in the standby state, it is effective to reduce the leakage power even if a speed of the circuit is sacrificed. In this method, even if the speed of the circuit is reduced, the operational frequency is reduced, an erroneous operation is not executed, and the leakage power is reduced by highly applying the substrate voltage Vbb and reducing the operating voltage Vdd.

Another method is known, which is to block supply of power to the logic circuit in a standby state and apply the voltage Vbb to an SRAM in order to reduce the amount of a leakage current in a semiconductor circuit (LSI) that has the logic circuit and the SRAM. In addition, the following method has been proposed, which is to block supply of power to a region that is among blocks obtained by dividing the SRAM and in which data is not held in the standby state. This method is to reduce leakage power of the standby state. Leakage power is reduced by blocking supply of power to a circuit that does not operate in the standby state. For the SRAM that holds data in the standby state, leakage power is reduced by applying the voltage Vbb.

As described above, leakage power is reduced by stopping supply of power to a logic circuit such as a processor and a memory block that is not used. For the logic circuit such as a processor, a method has been proposed, which is to stop power supply when the logic circuit is not used, set an operating frequency on the basis of a requested processing speed upon an operation, set an operating voltage and a substrate voltage in consideration of a temperature when the logic circuit operates. For the memory that holds data even in the standby state, the leakage power is reduced by controlling the voltage Vbb.

Japanese National Publication of International Patent Application No. 2010-519612, Japanese Laid-open Patent Publications Nos. 2003-132683, 2000-149561, 09-212416, and 04-329663 and Japanese Patent No. 4835856 are examples of related art.

SUMMARY

According to an aspect of the invention, a circuit system includes: a plurality of memory blocks; a power supply circuit configured to supply operating power and substrate power to the plurality of memory blocks; a plurality of first power supply switches configured to control whether or not the operating power is supplied from the power supply circuit to the plurality of memory blocks; and a control circuit configured to control the power supply circuit and the plurality of first power supply switches, wherein the control circuit changes a voltage of the operating power to be supplied by the power supply circuit and a voltage of the substrate power to be supplied by the power supply circuit, based on a state of whether the first power supply switches are in a supplying state or a blocking state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The power to be consumed by the semiconductor device (semiconductor circuit) mainly includes the switching power and the leakage power, and there is a demand for a reduction in the power to be consumed while achieving requested performance. If the memory does not hold data in the standby state, supply of operating power to the memory is stopped in the standby state. If the memory holds data in the standby state, leakage power is reduced by controlling the voltage Vbb of the substrate power supply. Specifically, various methods for reducing leakage power of the memory in the standby state have been proposed. For the case where a part of the memory is in the active state and another part of the memory is in the standby state, a reduction in power to be consumed by the active part of the memory has not been paid attention.

According to the following embodiments, a circuit system of semiconductor device that reduces power to be consumed by stopping supply of operating power to a part of a memory on the basis of an operational state of the circuit system is achieved.

First Embodiment

Figure 1:
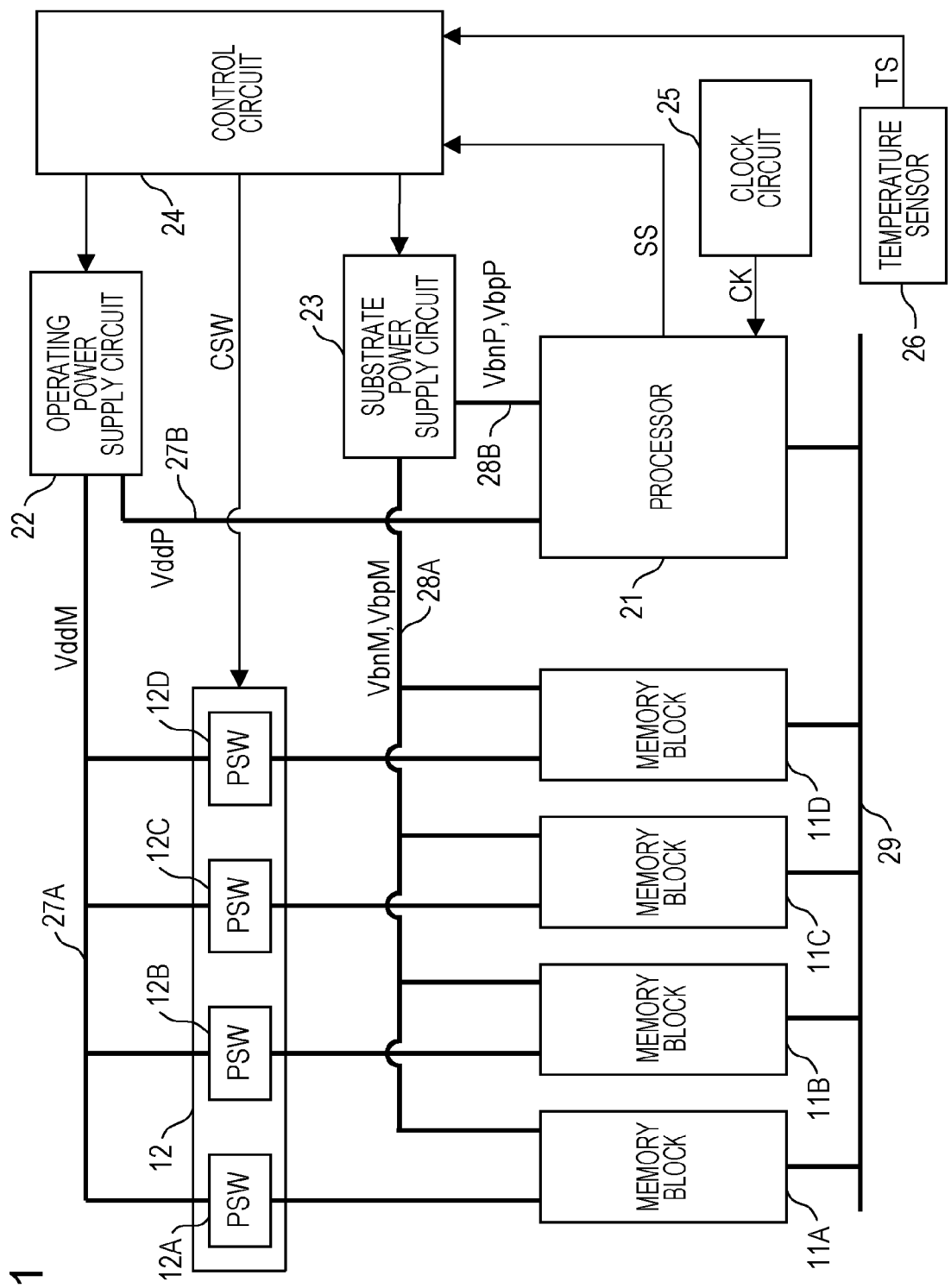
FIG. 1 is a block diagram illustrating an overall configuration of a circuit system according to the first embodiment.

FIG. 1 is a block diagram illustrating an overall configuration of a circuit system according to the first embodiment. The circuit system according to the first embodiment includes a plurality of memory blocks 11A to 11D, a power supply switch unit (PSW) 12, a processor (logic circuit) 21, an operating power supply circuit 22, a substrate power supply circuit 23, a control circuit 24, a clock circuit 25, and a temperature sensor 26.

The operating power supply circuit 22 outputs memory operating power with a voltage VddM so as to supply the memory operating power with the voltage VddM to the memory blocks 11A to 11D and outputs logic operating power with a voltage VddP so as to supply the logic operating power with the voltage VddP to the processor 21. The memory operating power and the logic operating power may be generated by the operating power supply circuit 22 or supplied from another part. The memory operating power with the voltage VddM is supplied as high-potential-side power for the memory blocks 11A to 11D, while the logic operating power with the voltage VddP is supplied as high-potential-side power for the processor 21. A low-potential-side power supply VSS for the memory blocks 11A to 11D and processor 21 is common, and an illustration thereof is omitted in FIG. 1. The control circuit 24 controls the operating power supply circuit 22 so as to cause the operating power supply circuit 22 to change the voltage of the memory operating power to be output and the voltage of the logic operating power to be output, as described later.

The substrate power supply circuit 23 outputs memory substrate power with voltages VbnM and VbpM so as to supply the memory substrate power with the voltages VbnM and VbpM to the memory blocks 11A to 11D and outputs logic substrate power with voltages VbnP and VbpP so as to supply the logic substrate power with the voltages VbnP and VbpP to the processor 21. The memory substrate power and the logic substrate power may be generated by the substrate power supply circuit 23 or supplied from another part. The memory substrate power with the voltage VbnM is applied to back gates (wells) of NMOS transistors of the memory blocks 11A to 11D, while the memory substrate power with the voltage VbpM is applied to back gates (wells) of PMOS transistors of the memory blocks 11A to 11D. Similarly, the logic substrate power with the voltage VbnP is applied to a back gate (well) of an NMOS transistor of the processor 21, while the logic substrate power with the voltage VbpP is applied to a back gate (well) of a PMOS transistor of the processor 21. The control circuit 24 controls the substrate power supply circuit 23 so as to cause the substrate power supply circuit 23 to change the voltages of the memory substrate power to be output and the voltages of the logic substrate power to be output, as described later.

The power supply switch unit 12 has a plurality of power supply switches 12A to 12D that are arranged for the memory blocks 11A to 11D, respectively. The memory operating power with the VddM is supplied to the memory blocks 11A to 11D through the power supply switches 12A to 12D. The power supply switches 12A to 12D are controlled by the control circuit 24 so as to become a supplying state or a blocking state. In the supplying state, the memory operating power is supplied through the power supply switches 12A to 12D to the memory blocks 11A to 11D. In the blocking state, the supply of the memory operating power is blocked by the power supply switches 12A to 12D.

To the processor 21, the logic operating power with the voltage VddP is supplied from the operating supply circuit 22 and the logic substrate power with the voltages VbnP and VbpP is supplied from the substrate power supply circuit 23. The processor 21 accesses the memory blocks 11A to 11D, an input and output port (not illustrated), and the like in accordance with a program loaded in the memory blocks 11A to 11D, executes data processing in accordance with the program, and thereby achieves functions of the circuit system. The processor 21 acquires information on the memory blocks 11A to 11D from a memory map obtained by compiling the program, while the information is used for the execution of the data processing. The processor 21 instructs the control circuit 24 to stop the supply of the power to a memory block that is not used. In addition, the processor 21 has information on a load amount calculated from a result of the compilation of the program and a result of analysis of an operation upon the execution of the program and may set an operating speed that enables the processing to be executed at the calculated load amount. The following description assumes that the operating speed is a fixed value in order to simplify the description.

The clock circuit 25 supplies a clock CK to the processor 21. When the memory blocks 11A to 11D and another part operate in synchronization with the clock CK, the clock CK is supplied to the memory blocks 11A to 11D and another part. As described above, in order to change the operating speed on the basis of the load amount, the frequency of the clock CK that is output from the clock circuit 25 is changed. The following description, however, assumes that the frequency of the clock CK is a fixed value.

The memory blocks 11A to 11D are independent of each other and may be set to an operating state or a non-operating state by turning on or off the corresponding power supply switches 12A to 12D. In the operating state, the operating power is supplied to the memory blocks 11A to 11D. In the non-operating state, the supply of the operating power to the memory blocks 11A to 11D is blocked. The memory substrate power with the voltages VbnM and VbpM is commonly supplied to the memory blocks 11A to 11D from the substrate power supply circuit 23. The memory blocks 11A to 11D are connected to the processor 21 through a common bus (including an address bus and a data bus) 29. Thus, the processor 21 does not access two or more of the memory blocks 11A to 11D simultaneously, and accesses one of the memory blocks 11A to 11D.

The control circuit 24 controls the operating power supply circuit 22, the substrate power supply circuit 23, and the power supply switches 12A to 12D included in the power supply switch unit 12 on the basis of an instruction from the processor 21 and a temperature detected by the temperature sensor 26. It is preferable that the control circuit 24 be formed as a part of the processor 21.

Power to be consumed by the semiconductor device (semiconductor circuit) varies depending on the temperature. Especially, the leakage power largely varies depending on the temperature. Thus, the ratio of the switching power and leakage power of the power to be consumed changes when the temperature changes. Thus, even when the number of memory blocks to which the operating power is supplied is not changed, the optimal voltage Vdd of the operating power supply and the optimal voltage Vbb of the substrate power supply vary depending on the temperature. Normally, when the temperature is high, the leakage power is large. Thus, when the temperature is high, it is effective to highly apply the voltage Vbb. In the first embodiment, the temperature sensor 26 detects the temperature, and the voltages Vdd and Vbb are set to appropriate voltage values on the basis of the detected temperature, and whereby the power to be consumed is reduced.

The circuit system illustrated in FIG. 1 may be arranged in a single semiconductor device (semiconductor circuit) or achieved by combining a plurality of the semiconductor devices. If the circuit system is formed in the semiconductor devices, the memory blocks 11A to 11D are formed in different memory devices, and the power supply switches 12A to 12D are arranged between an operating power supply line 27A extending from the operating power supply circuit 22 and operating power supply terminals of the memory devices.

In this case, the processor 21 and the control circuit 24 are achieved by a single processor device, while the operating power supply circuit 22 and the substrate power supply circuit 23 are achieved by a single circuit.

Figure 2:
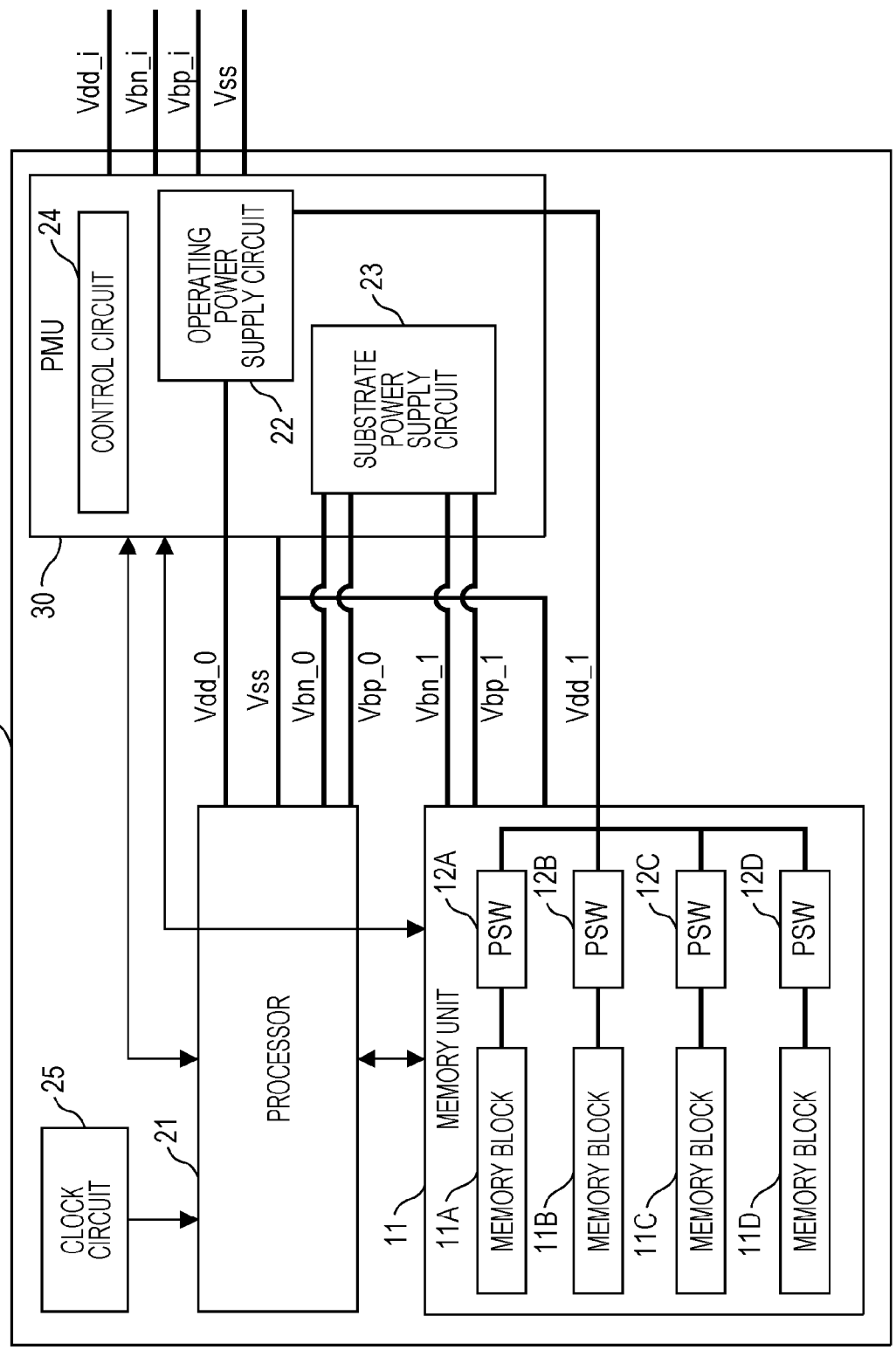
FIG. 2 is a block diagram illustrating an outline configuration of a semiconductor device (LSI) provided with the circuit system illustrated in FIG. 1.

FIG. 2 is a block diagram illustrating an outline configuration of a semiconductor device (LSI) 10 that has the circuit system illustrated in FIG. 1. The configuration of the LSI 10 illustrated in FIG. 2 is the same as the configuration illustrated in FIG. 1 except that the memory block 11A to 11D are included in a memory unit 11 and that the operating power supply circuit 22, the substrate power supply circuit 23, and the control circuit 24 are included in a power management unit (PMU) 30. As illustrated in FIG. 2, voltages Vdd_i, Vbn_i, Vbp_i, and Vss are supplied to the LSI 10 from the outside of the LSI 10. The operating power supply circuit 22 generates voltages Vdd_0 and Vdd_1 from the voltage Vdd_i on the basis of an operational state, supplies the voltage Vdd_0 to the processor 21, supplies the voltage Vdd_1 to the memory unit 11, and supplies the voltage Vss to the processor 21 and the memory unit 11. The substrate power supply circuit 23 generates voltages Vbn_0, Vbn_1, Vbp_0, and Vbp_1 from the voltages Vbn_i and Vbp_i on the basis of the operational state. The substrate power supply circuit 23 supplies the voltages Vbn_0 and Vbp_0 to the processor 21 and supplies the voltages Vbn_1 and Vbp_1 to the memory unit 11. The voltages Vdd_0, Vdd_1, Vbn_0, Vbn_1, Vbp_0, and Vbp_1 are changed to voltages that are different from each other, as described later.

As illustrated in FIGS. 1 and 2, in the first embodiment, the power supply systems for the memory unit 11 and processor 21 are different from and independent of each other, and thus optimization of the power for the processor 21 and optimization of the power for the memory unit 11 may be independent of each other. The first embodiment assumes that the single processor 21 is arranged and the power for the processor 21 is optimized by a known method. Thus, the optimization of the power for the memory unit 11 is described below.

Power to be consumed by the memory unit 11 includes both switching power to be consumed upon access for reading or writing and leakage power to be generated upon the supply of the operating power. The leakage power is proportional to the area of a memory to which the operating power is supplied. Thus, the larger the number of memory blocks to which the operating power is supplied, the larger the leakage power. If the operating frequency is a fixed value, the switching power is proportional to the amount of data accessed for reading or writing.

Three combinations V0 (Vdd0, Vbb0), V1 (Vdd1, Vbb1), and V2 (Vdd2, Vbb2) of the voltage Vdd of the operating power supply and the voltage (substrate voltage) Vbb of the substrate power supply are considered on the assumption that the operating frequency is the fixed value. As described above, the substrate voltage includes a substrate voltage Vbn for an NMOS transistor and a substrate voltage Vbp for a PMOS transistor. In order to simplify the following description, the voltages Vbn and Vbp are combined and treated as a voltage Vbb of the substrate power supply. The NMOS transistor and the PMOS transistor are represented by an NMOS and a PMOS in some cases.

The voltage Vdd0 is lowest among the voltages Vdd0, Vdd1 and Vdd2, while the voltage Vdd2 is higher than the voltage Vdd1. The substrate voltage Vbb0 is lowest on a reverse bias (in a negative direction for the NMOSs and in a positive direction for the PMOSs) among the voltages Vbb0, Vbb1, and Vbb2, while the voltage Vbb2 is higher on the reverse bias than the Vbb1. Regarding the voltage combination V2, the voltage Vbb is highly applied so as to reduce the leakage power, the speed of the circuit is reduced due to the application of the voltage Vbb, and thus the operating frequency is maintained at the fixed value by increasing the power supply voltages. The three combinations of the voltages Vdd and Vbb are set so that the voltage combination V0 causes the largest leakage power and the smallest switching power and the voltage combination V2 causes the smallest leakage power and the largest switching power. As described above, the leakage power of a memory is proportional to the area of the memory to which the power is supplied. If the amount of data accessed for reading or writing is not changed, the larger the number of memory blocks to which the power is supplied, the larger the ratio of the leakage power to the switching power. If the leakage power is dominant among the total power, it is effective to reduce the leakage power and set the combination V2 of the voltages. On the other hand, if the number of memory blocks to which the power is supplied is small, and the leakage power is small or the switching power is dominant, it is effective to reduce the switching power and set the combination V0 of the voltages.

As combinations of the voltage of the operating power supply and the voltage of the substrate power supply, which achieve an operation at an operating speed (clock frequency) F0, three operational modes Mode0, Mode1, and Mode2 are defined. The combinations of the voltage of the operating power supply and the voltage of the substrate power supply in the modes Mode0 to Mode2 are the combinations V0 (Vdd0, Vbb0), V1 (Vdd1, Vbb1), and V2 (Vdd2, Vbb2). The power supply voltage for the mode Mode0 is lowest among the power supply voltages for the modes Mode0 to Mode2, while the power supply voltage for the mode Mode2 is higher than the power supply voltage for the mode Mode1. The substrate voltage for the mode Mode0 is lowest on a reverse bias (in a negative direction for the NMOSs and in a positive direction for the PMOSs) among the substrate voltages for the modes Mode0 to Mode2, while the substrate voltage for the mode Mode2 is higher on the reverse bias than the substrate voltage for the mode Mode1. Thus, the leakage power is largest and the switching power is smallest in the mode Mode0, while the leakage power is smallest and the switching power is largest in the mode Mode2.

Table 1 indicates an example of the operating power supply voltage (Vdd), the substrate power supply voltages (Vbn, Vbp), the leakage power (P_leak), and the switching power (P_switch) in each of the modes Mode0 to Mode2. In this example, the temperature is indicated by T and is a fixed value (T0), and the operating frequency F is a fixed value (F0). In Table 1, the leakage power P_leak is leakage power per memory block, and the switching power P_switch is the average switching power upon memory access.

TABLE 1

|  | Vdd | Vbn | Vbp | P_leak (a.u.) | P_switch (a.u.) |
|---|---|---|---|---|---|
| Mode0 | Vdd_0 | Vbn_0 | Vbp_0 | 30 | 60 |
| Mode1 | Vdd_1 | Vbn_1 | Vbp_1 | 10 | 90 |
| Mode2 | Vdd_2 | Vbn_2 | Vbp_2 | 1 | 120 |

Power to be consumed in each of the modes Mode0 to Mode2 for the cases (Mem1 to Mem4) where the numbers of memory blocks to which the operating power is supplied are 1 to 4 is calculated and indicated by Table 2. It is assumed that power that is supplied to the memory blocks when the supply of the operating power is blocked is 0. In addition, it is assumed that even when the number of memory blocks to which the operating power is supplied is changed, the number of times of access to the memory blocks is not changed and the switching power is fixed.

TABLE 2

|  | Mem1 | Mem2 | Mem3 | Mem4 |
|---|---|---|---|---|
| Mode0 | <u>90</u> | 120 | 150 | 180 |
| Mode1 | 100 | <u>110</u> | <u>120</u> | 130 |
| Mode2 | 121 | 122 | 123 | <u>124</u> |

As is apparent from Table 2, when the number of memory blocks to which the operating power is supplied is changed from 1 through 2 and 3 to 4, modes in which the power is minimal in the cases Mem1 to Mem4 are different. In the case Mem1 in which the number of memory blocks to which the power is supplied is 1, the power is minimal in the mode Mode0. In the cases Mem2 and Mem3 in which the numbers of memory blocks to which the power is supplied are 2 and 3, the power is minimal in the mode Mode1. In the case Mem4 in which the number of memory blocks to which the power is supplied is 4, the power is minimal in the mode Mode2.

Figure 3A:
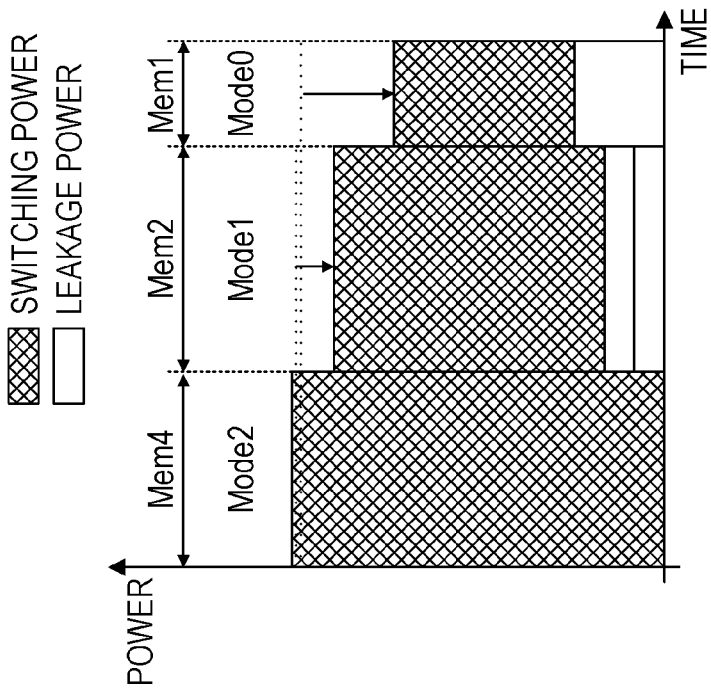
FIGS. 3A and 3B are diagrams illustrating changes in power to be consumed when the number of memory blocks used is changed from 4 through 2 to 1.
Figure 3B:
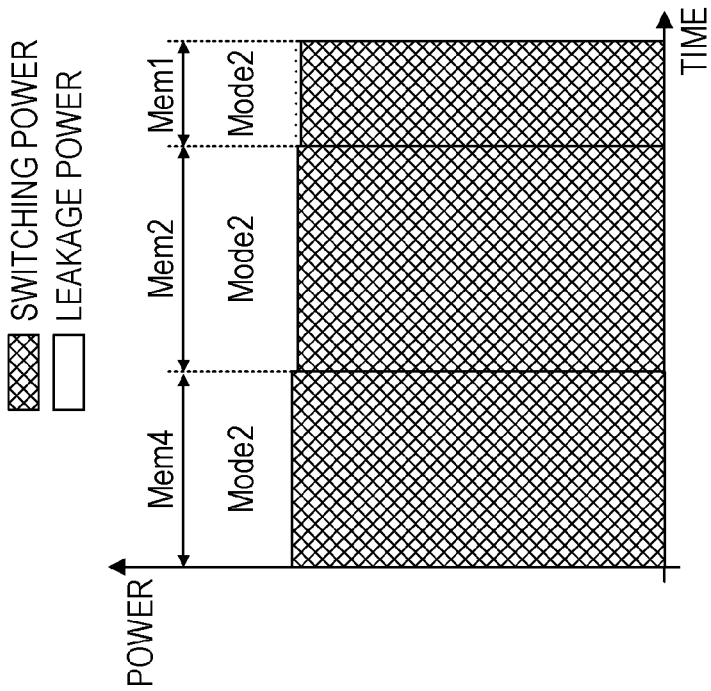

FIGS. 3A and 3B are diagrams illustrating changes in power to be consumed when the number of memory blocks used is changed from 4 through 2 to 1. In an initial state, four memory blocks are used and the power starts to be supplied in the mode Mode2 that is optimal for the case where the four memory blocks are used. FIG. 3A illustrates that the mode is fixed to the mode Mode2, while the FIG. 3B illustrates that the mode is controlled so that the power is minimal. It is apparent from FIG. 3B that power to be consumed is reduced, compared with the case illustrated in FIG. 3A, when two memory blocks are used and when one memory block is used.

Figure 4:
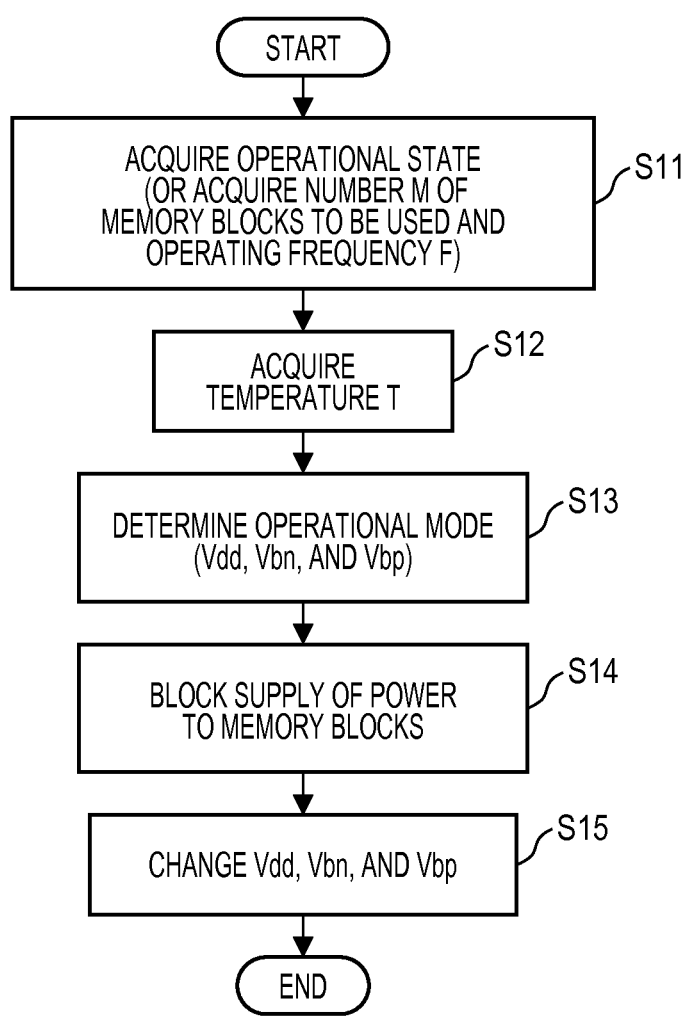
FIG. 4 is a flowchart of a process of switching a mode according to the first embodiment.

FIG. 4 is a flowchart of a process of switching a mode according to the first embodiment. The case where the number of memory blocks used is changed from 4 to 2 is described below as an example.

In operation S11, an operational state (the number M of memory blocks used and the operating frequency F) is acquired. The operating frequency (F0) is fixed, and the number M of memory blocks used is 2.

In operation S12, the temperature T is acquired from the temperature sensor 26. The temperature T is the fixed value T0.

In operation S13, the operational mode Mode0, Mode1, or Mode2 is determined on the basis of the acquired values, and the operating power supply voltage (Vdd) for the determined mode and the substrate power supply voltages (Vbn, Vbp) for the determined mode are determined on the basis of the acquired values. When the number M is 2, the mode Mode1 causes the power to be consumed to be minimal as described above, and the voltages Vdd_1, Vbn_1, and Vbp_1 are selected.

In operation S14, an instruction is provided to the power supply switches 12A to 12D included in the power supply switch unit 12, and the supply of the operating power to the memory blocks other than the two memory blocks used is blocked.

In operation S15, the selected operating power supply voltage and the selected substrate power supply voltages are set, and the voltages Vdd, Vbn, and Vbp are adjusted and changed by the PMU 30.

The case where the temperature and the operating frequency are the fixed values is described above. When the temperature and the operating frequency vary, the same procedure (flow) is basically executed. For example, the operating frequency may be set to any of two values (F0 and F1), while the temperature may be classified into two values (T0 and T1) (when the temperature is not higher than a value Tc, the temperature is classified into the temperature T0, and when the temperature is higher than the value Tc, the temperature is classified into the temperature T1). In this case, as indicated by Table 3, the optimal modes that correspond to the numbers M of memory blocks to be used and combinations of the operating frequency and the classified temperature are listed.

TABLE 3

|  | (T0, F0) | (T0, F1) | (T1, F0) | (T1, F1) |
|---|---|---|---|---|
| One memory block used (M = 1) | Mode0 | Mode0 | Mode1 | Mode1 |
| Two memory blocks used (M = 2) | Mode1 | Mode0 | Mode2 | Mode1 |
| Three memory blocks used (M = 3) | Mode1 | Mode1 | Mode2 | Mode2 |
| Four memory blocks used (M = 4) | Mode2 | Mode2 | Mode2 | Mode2 |

In the first embodiment, any of the three voltage modes is assigned to each of the combinations of the operating frequency and the classified temperature in order to simplify the description. A requested circuit speed varies depending on the operating frequency and a change in the temperature. Thus, a combination of the operating power supply voltage and the substrate power supply voltages, which satisfies the requested circuit speed, varies. It is, therefore, preferable that any of the voltage modes be set for each of the combinations of the operating frequency and the classified temperature.

As described above, the capacity of a memory to be used is changed on the basis of the number of memory blocked to be used, the leakage power varies depending on the capacity of the memory, and thus the ratio of the switching power and the leakage power in the memory currently used varies. Thus, a combination of the operating power supply voltage and the substrate power supply voltages, which minimizes power to be consumed, varies. Power to be consumed by the memory on the basis of the operational state may be reduced by appropriately controlling the operating power supply voltage and the substrate power supply voltages on the basis of the number of memory blocks used.

The first embodiment is effective for the case where an effect of power to be consumed by the processor 21 is lower than an effect of power to be consumed by the memory blocks (included in the memory unit). For example, a remarkable effect is obtained when a power supply system for the processor 21 is separated from a power supply system for the memory blocks 11A to 11D and power to be consumed by the processor 21 is smaller than power to be consumed by the memory blocks 11A to 11D.

Second Embodiment

Figure 5:
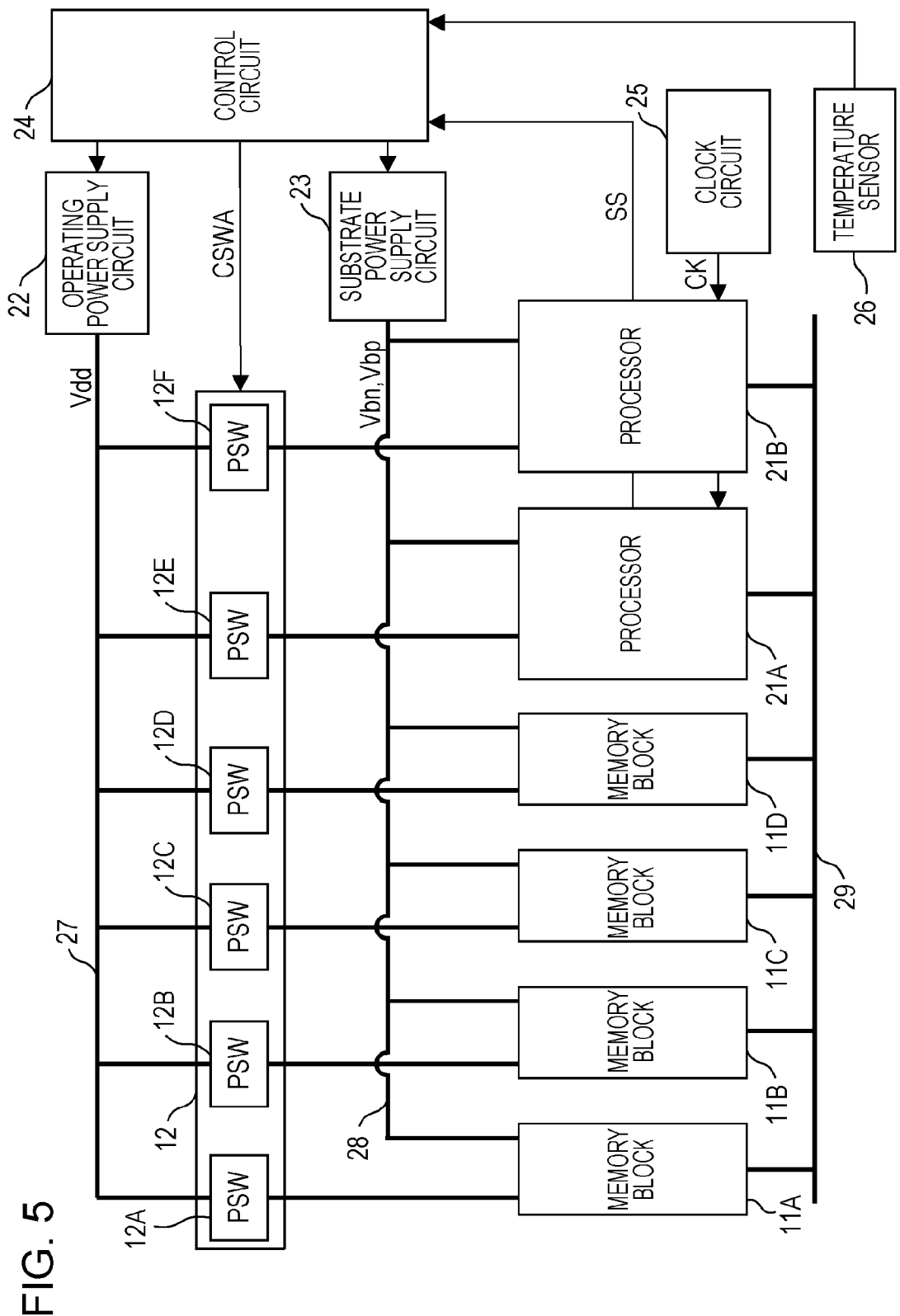
FIG. 5 is a block diagram illustrating an overall configuration of a circuit system according to the second embodiment.

FIG. 5 is a block diagram illustrating an overall configuration of a circuit system according to the second embodiment. The circuit system according to the second embodiment includes two processors 21A and 21B and two power supply switches 12E and 12F corresponding to the processors 21A and 21B. This configuration of the circuit system according to the second embodiment is different from the circuit system according to the first embodiment. In other words, the circuit system according to the second embodiment has a multi-processor configuration and controls supply of operating power to the processors 21A and 21B. In a high-load state, the operating power is supplied to the processors 21A and 21B that thereby operate and execute processing with high processing power. In a low-load state, the operating power is supplied to only the processor 21A or 21B that thereby operates and executes processing with low processing power. A part or all of the memory blocks may hold stored data while the supply of the operating power to the processors 21A and 21B is stopped.

Figure 6:
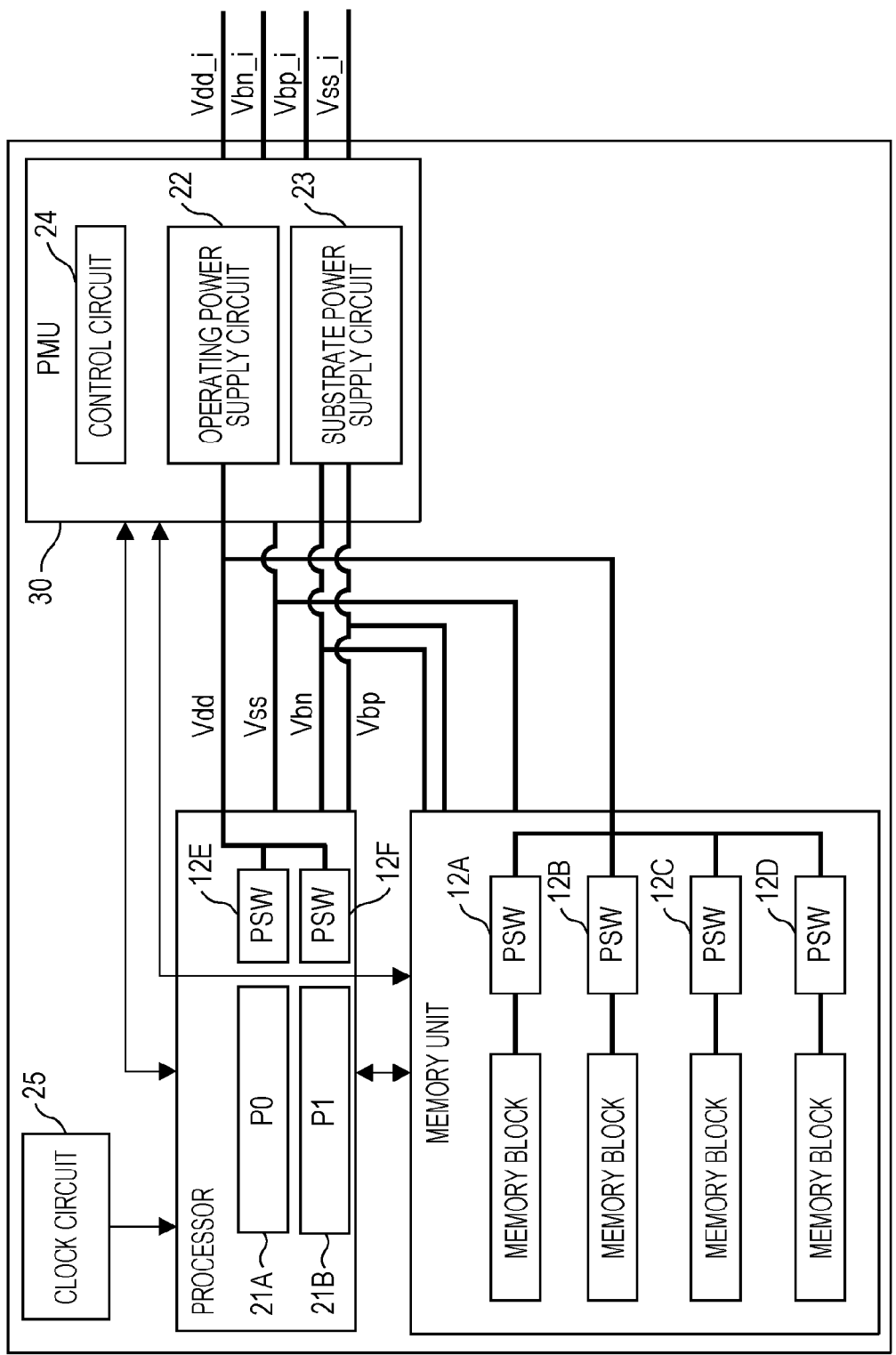
FIG. 6 is a block diagram illustrating an outline configuration of a semiconductor device (LSI) provided with the circuit system illustrated in FIG. 5.

FIG. 6 is a block diagram illustrating an outline configuration of the semiconductor device (LSI) 10 that has the circuit system illustrated in FIG. 5. FIG. 6 corresponds to FIG. 2, and a description of the parts that are illustrated in FIGS. 2 and 6 is omitted.

In the circuit system according to the second embodiment, a supply system for the operating power supply and substrate power supply for the processors 21A and 21B is the same as a supply system for the operating power supply and substrate power supply for the memory blocks 11A to 11D. The operating power supply circuit 22 outputs only the operating power with the voltage Vdd. The operating power with the voltage Vdd is supplied to the memory blocks 11A to 11D through the power supply switches 12A to 12D and supplied to the processors 21A and 21B through the power supply switches 12E and 12F. The substrate power supply circuit 23 outputs only the substrate power with the voltages Vbn and Vbp. The substrate power with the voltages Vbn and Vbp is commonly supplied to the memory blocks 11A to 11D and the processors 21A and 21B.

In the circuit system according to the second embodiment, the voltage Vdd of the operating power to be supplied and the voltages Vbn and Vbp of the substrate power are changed so that power to be consumed is minimized on the basis of whether the power supply switches 12A to 12F are in a supplying state or a blocking state.

In the first embodiment, power to be consumed by the memory unit 11 including the memory blocks 11A to 11D is optimized without consideration of the parts (such as the processor 21) other than the memory unit 11. In the second embodiment, the circuit system according to the second embodiment optimizes both power to be consumed by the memory blocks 11A to 11D and power to be consumed by the two processors 21A and 21B. Basic control of the circuit system according to the second embodiment is the same as the first embodiment.

The ratio of switching power and leakage power of the power to be consumed by the processors 21A and 21B varies depending on the configuration of the circuit and an operational state. Thus, when the voltage of the operating power and the voltages of the substrate power are common to the memory blocks 11A to 11D and the processors 21A and 21B, whether the operating power is supplied to both processors 21A and 21B or to either the processor 21A or 21B affects the ratio of the leakage power and the switching power in the overall circuit system. Thus, when the circuit system according to the second embodiment has the plurality of processors that are connected to the power supply system for the memory unit 11 and for which the supply of the operating power is controlled, the optimal voltages Vdd and Vbb vary depending on whether the power is supplied to the processors or blocked. Thus, in the second embodiment, power to be consumed by the memory blocks and power to be consumed by the processors are optimized.

For example, it is assumed that power to be consumed by the processor 21A is dominant, compared with power to be consumed by the memory unit 11 when the power is supplied to all the memory blocks 11A to 11D, and that the switching power is dominant among the power to be consumed by the processor 21A. In this case, when the operating power is supplied to the processor 21A so that the processor 21A is in an active state, the aforementioned voltage combination V0 that reduces the switching power is effective. If the supply of the operating power to the processor 21A is blocked and the power to be consumed by the memory unit 11 is dominant, the voltage combination V2 that reduces the leakage power is effective. In this manner, the power to be consumed may be reduced by setting appropriate voltages Vdd and Vbb on the basis of the states of the power supply switches for the memory blocks 11A to 11D and processors 21A and 21B.

In the second embodiment, three operational modes Mode0 to Mode1 are defined as combinations of the operating power supply voltage and substrate power supply voltages. Table 4 indicates an example of the operating power supply voltage (Vdd), the substrate power supply voltages (Vbn and Vbp), the leakage power and switching power of the memory blocks 11A to 11D, and the leakage power and switching power of the processors 21A and 21B in each of the modes. In this example, the temperature T is the fixed value (T0) and the operating frequency is the fixed value (F0). In Table 4, P_leak_m indicates leakage power per memory block, P_switch_m indicates the average switching power upon memory access, P_leak_l indicates leakage power per processor, and P_switch_l indicates switching power per processor in an average operation.

TABLE 4

|  | Vdd | Vbn | Vbp | P_leak_m (a.u.) | P_switch_m (a.u.) | P_leak_l (a.u.) | P_switch_l (a.u.) |
| --- | --- | --- | --- | --- | --- | --- | --- |
| Mode0 | Vdd_0 | Vbn_0 | Vbp_0 | 60 | 60 | 30 | 50 |
| Mode1 | Vdd_1 | Vbn_1 | Vbp_1 | 20 | 90 | 10 | 90 |
| Mode2 | Vdd_2 | Vbn_2 | Vbp_2 | 2 | 120 | 1 | 130 |

The power to be consumed when the number L of processors to which the operating power is supplied is changed from 1 to 2 and the number M of memory blocks to which the operating power is supplied is changed from 1 through 2 and 3 to 4 is calculated and indicated by Table 5. It is assumed that power to be consumed by a processor for which the supply of the operating power is blocked and power to be consumed by a memory block for which the supply of the operating power is blocked are 0. In addition, it is assumed that even when the number of memory blocks to which the operating power is supplied is changed, the number of times of access to the memory unit 11 is not changed and the switching power is fixed. Furthermore, it is assumed that even when the number of processors to which the operating power is supplied is changed, the processors consume the same leakage power and switching power during an operation.

TABLE 5

|  | L = 1 M = 1 | L = 1 M = 2 | L = 1 M = 3 | L = 1 M = 4 | L = 2 M = 1 | L = 2 M = 2 | L = 2 M = 3 | L = 2 M = 4 |
| --- | --- | --- | --- | --- | --- | --- | --- | --- |
| Mode0 | <u>200</u> | 260 | 320 | 380 | <u>280</u> | 340 | 400 | 460 |
| Mode1 | 210 | <u>230</u> | <u>250</u> | 270 | 310 | <u>330</u> | <u>350</u> | <u>370</u> |
| Mode2 | 253 | 255 | 257 | <u>259</u> | 384 | 386 | 388 | 390 |

As is apparent from Table 5, when the number of processors to which the operating power is supplied and the number of memory blocks to which the operating power is supplied are changed, modes in which power to be consumed is minimal are different. When the numbers L and M are 1, and when the number L is 2 and the number M is 1, the mode Mode0 causes the power to be consumed to be minimal. When the number L is 1 and the number M is 4, the mode Mode2 causes the power to be consumed to be minimal. In the other cases, the mode Mode1 causes the power to be consumed to be minimal. It is assumed that when the two processors are stopped (or the number L is 0) and the power is to be supplied to a memory block, the memory unit 11 is not accessed and holds data, and the switching power for the memory unit 11 is 0. Thus, the mode Mode2 that causes the leakage power to be small is effective. When the number L is 0, the mode Mode2 is set. Appropriate operational modes are indicated by Table 6.

TABLE 6

|  | L = 0 | L = 1 | L = 2 |
| --- | --- | --- | --- |
| M = 1 | Mode2 | Mode0 | Mode0 |
| M = 2 | Mode2 | Mode1 | Mode1 |
| M = 3 | Mode2 | Mode1 | Mode1 |
| M = 4 | Mode2 | Mode2 | Mode1 |

Figure 7:
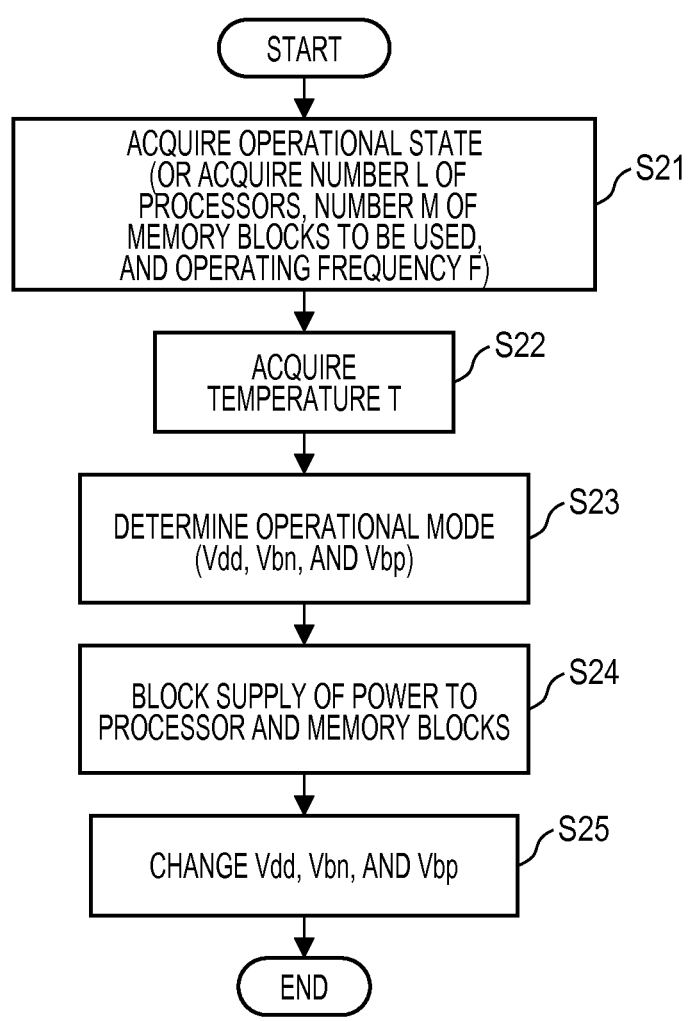
FIG. 7 is a flowchart of a process of switching a mode according to the second embodiment.

FIG. 7 is a flowchart of a process of switching a mode according to the second embodiment. The process illustrated in FIG. 7 is basically the same as the first embodiment. In operation S21, the number L of processors to be used is acquired in order to acquire the operational state, and an instruction is provided to the power supply switches for the processors in order to control the power supply switches. This feature is different from the first embodiment.

Third Embodiment

Figure 8:
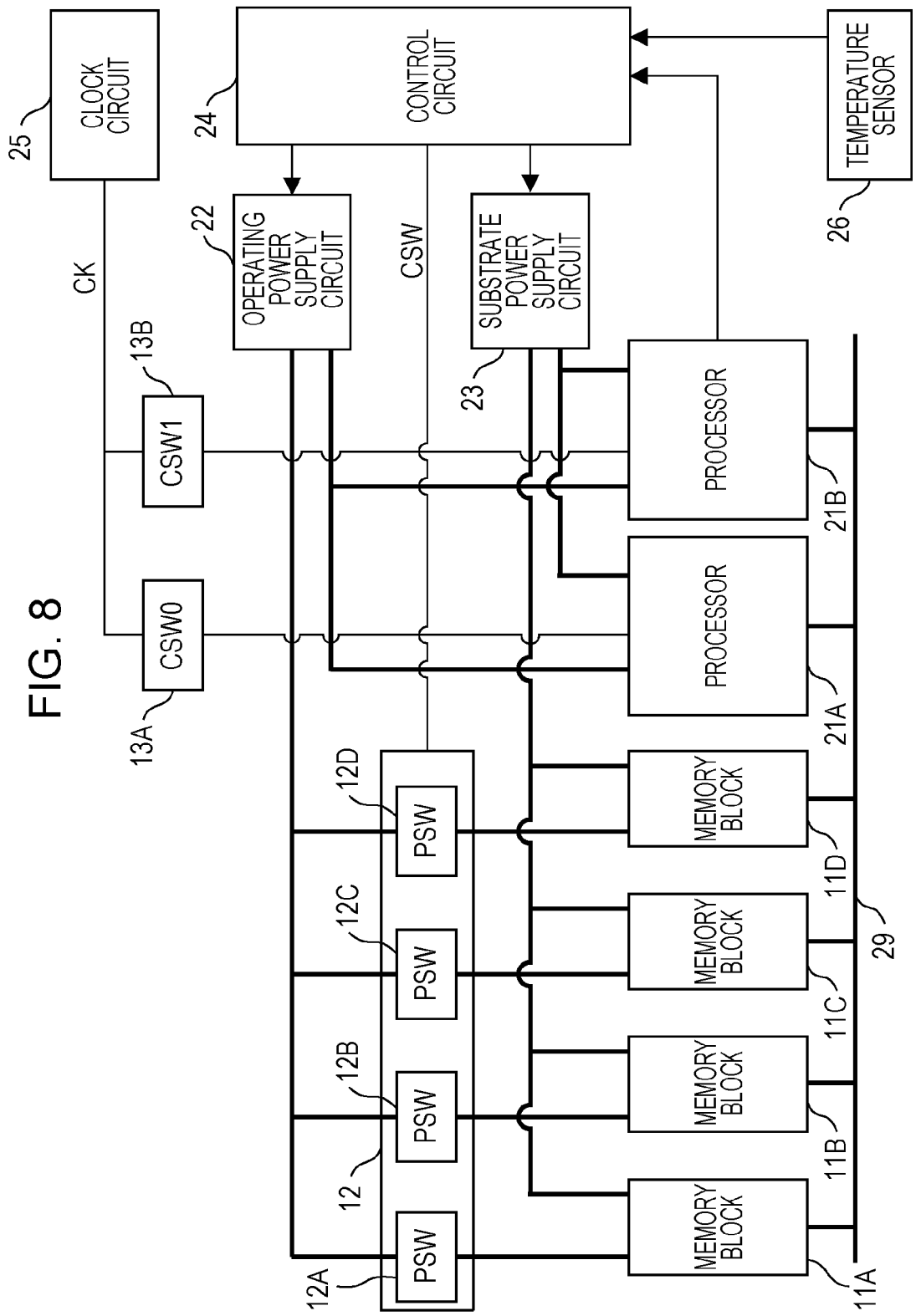
FIG. 8 is a block diagram illustrating an overall configuration of a circuit system according to the third embodiment.

FIG. 8 is a block diagram illustrating an overall configuration of a circuit system according to the third embodiment. The circuit system according to the third embodiment has a similar configuration to the circuit system according to the second embodiment and includes gated clock buffers 13A and 13B instead of the power supply switches 12E and 12F. The gated clock buffers 13A and 13B are arranged for the processors 21A and 21B, respectively, and control supply of the clock CK from the clock circuit 25 to the processors 21A and 21B.

In the second embodiment, the supply of the operating power is blocked during the time when the processors 21A and 21B do not operate. Even when the supply of the clock CK is blocked by the gated clock buffers 13A and 13B, the operations of the processors 21A and 21B may be stopped. In this case, only the switching power of the processors 21A and 21B is reduced, and the leakage power is consumed.

When the switching power is dominant among the power to be consumed by the processors 21A and 21B, the ratio of the leakage power to switching power of the power to be consumed by the processors 21A and 21B is small, and the supply of the clock CK to the processors 21A and 21B is blocked, the dominant switching power is reduced. Thus, even when the supply of the clock CK is blocked, an effect of reducing the power to be consumed by the processors 21A and 21B is obtained and the same as or similar to blocking of the supply of the operating power. Thus, the optimal voltages Vdd and Vbb vary depending on whether or not the supply of the clock CK to the processors 21A and 21B is blocked, like the second embodiment. The power to be consumed may be reduced by setting appropriate voltages Vdd and Vbb on the basis of the states of the power supply switches for the memory blocks 11A to 11D and of whether the supply of the clock CK to the processors 21A and 21B is blocked. Basic control is the same as the second embodiment.

In the third embodiment, when the supply of the clock CK is blocked during the time when the processors 21A and 21B do not operate, instead of blocking of the supply of the operating power, power is consumed as indicated by Table 7.

TABLE 7

|       | L = 1<br>M = 1 | L = 1<br>M = 2 | L = 1<br>M = 3 | L = 1<br>M = 4 | L = 2<br>M = 1 | L = 2<br>M = 2 | L = 2<br>M = 3 | L = 2<br>M = 4 |
|-------|------|------|------|------|------|------|------|------|
| Mode0 | 230  | 290  | 350  | 410  | <u>280</u> | 340  | 400  | 460  |
| Mode1 | <u>220</u> | <u>240</u> | 260  | 280  | 310  | <u>330</u> | <u>350</u> | <u>370</u> |
| Mode2 | 254  | 256  | <u>258</u> | <u>260</u> | 384  | 386  | 388  | 390  |

As indicated by Table 7, when the number L of processors to which the clock CK is supplied, and the number M of memory blocks to which the operating power is supplied, are changed, modes that cause power to be consumed to be minimal are different. When the number L is 2 and the number M is 1, the mode Mode0 causes power to be consumed to be minimal. When the number L is 1 and the number M is 3, and when the number L is 1 and the number M is 4, the mode Mode1 causes power to be consumed to be minimal. In the other cases, the mode Mode1 causes power to be consumed to be minimal.

Figure 9:
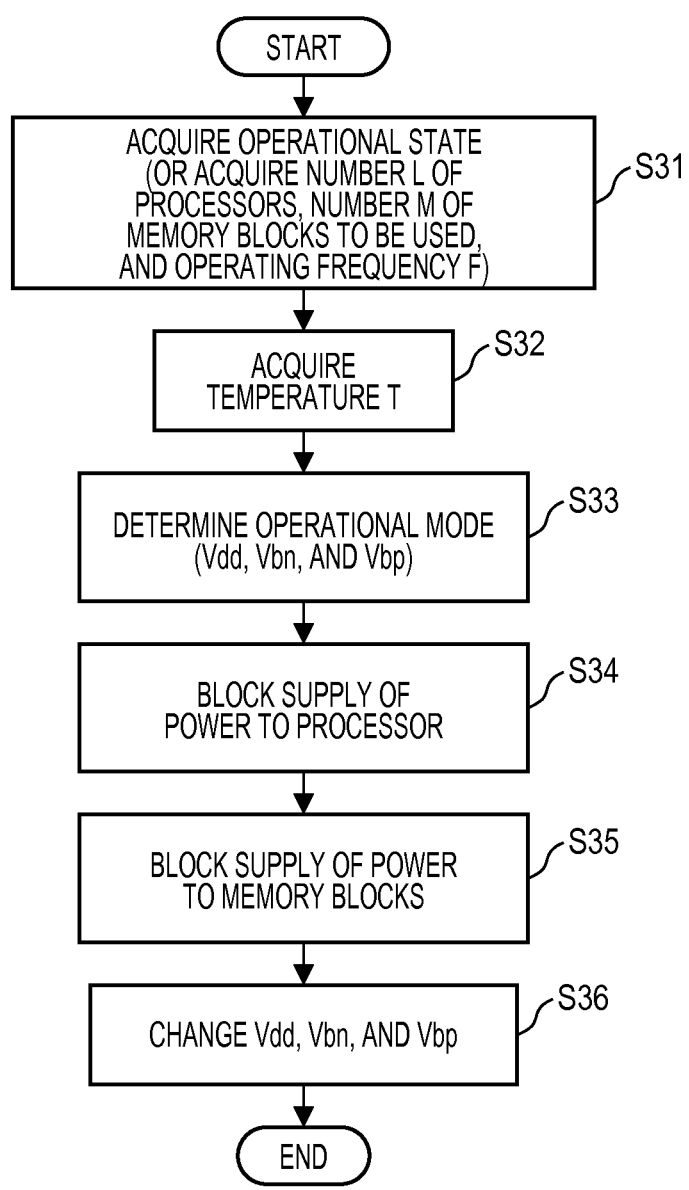
FIG. 9 is a flowchart of a process of switching a mode according to the third embodiment.

FIG. 9 is a flowchart of a process of switching a mode, while the process includes an operation of supplying the clock CK or blocking the supply of the clock CK is used instead of the operation of supplying the operating power during the time when the processors 21A and 21B do not operate. An instruction to block or supply the clock CK is provided to the gated clock buffers 13A and 13B instead of the instruction provided by the processors 21A and 21B to the power supply switches in the second embodiment.

As described above, the processor 21 has the information on the load amount calculated from the result of the compilation of the program and the result of the analysis of the operation upon the execution of the program and may set the operating speed that enables the processing to be executed at the calculated load amount. The clock circuit 25 changes the frequency of the clock CK on the basis of the set operating speed. The switching power of the semiconductor device (semiconductor circuit) is proportional to the number of times of switching of the circuit per unit time, and thus largely depends on the frequency (operating frequency) of the clock to be supplied to the circuit. When the clock frequency is increased twofold, the switching power increases about twofold. Since the ratio of the switching power and the leakage power varies depending on the clock frequency, it is preferable that approximate voltages Vdd and Vbb be set on the basis of the frequency of the clock to be supplied to the circuit system. The power to be consumed, therefore, is further reduced. When the clock frequency is increased, the ratio of the switching power increases. It is, therefore, effective to set the voltages (or the voltage combination V0 or a combination close to the voltage combination V0) so as to reduce the switching power.

As described in the first to third embodiments, the operating power supply voltage and the substrate power supply voltages are appropriately controlled on the basis of the number of memory blocks to be used (or memory blocks to which the operating power is supplied) and the number of processors to be used. Thus, power to be consumed by a part that is included in the circuit system (LSI) and in the active state may be reduced.

In the circuit system according to the embodiments, whether or not operating power is supplied to each of a plurality of memory blocks is controlled, and operational states of the memory blocks are changed by the control. In other words, the amount of data stored in memory blocks and causing leakage power due to a change in the number of memory blocks in an operating state is changed, and thus a desired voltage of an operating power supply and a desired voltage of a substrate power supply vary. In the circuit system according to the embodiments, the voltage of the operating power supply and the voltage of the substrate power supply are changed on the basis of whether a plurality of power supply switches cause power to be supplied or block the supply of the power, and a further reduction in power to be consumed is achieved.

The embodiments are described above, and various modified examples may be applied. For example, in each of the first to third embodiments, it is preferable that the overall circuit system be arranged in the single semiconductor device (LSI) or a plurality of the semiconductor devices on the basis of a configuration applied, and various combinations may be used. Although the circuit system is arranged in the semiconductor device, a part of the circuit system may be arranged in a discrete circuit. In a modified example, the power management unit (PMU) may be arranged outside the LSI.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A circuit system comprising:
   a plurality of memory blocks;
   a power supply circuit configured to supply operating power and substrate power to the plurality of memory blocks;

a plurality of first power supply switches configured to control whether or not the operating power is supplied from the power supply circuit to the plurality of memory blocks; and
a control circuit configured to control the power supply circuit and the plurality of first power supply switches,
wherein the control circuit changes a voltage of the operating power to be supplied by the power supply circuit and a voltage of the substrate power to be supplied by the power supply circuit, based on a state of whether each of the plurality of first power supply switches is in a supplying state or a blocking state.

2. The circuit system according to claim 1,
wherein the plurality of memory blocks are connected to a common data bus.

3. The circuit system according to claim 2, further comprising:
a clock circuit configured to supply a clock that causes parts included in the circuit system to operate in synchronization with each other.

4. The circuit system according to claim 3, further comprising:
at least one logic circuit connected to the plurality of memory blocks through the common data bus; and
a plurality of second power supply switches configured to control whether or not the operating power is supplied from the power supply circuit to the at least one logic circuit,
wherein the power supply circuit supplies the substrate power to the at least one logic circuit, and
wherein the control circuit changes the voltage of the operating power and the voltage of the substrate power, based on a state of whether the first power supply switches and at least one of the second power supply switches are in the supplying state or the blocking state.

5. The circuit system according to claim 3, further comprising:
at least one logic circuit connected to the plurality of memory blocks through the common data bus; and
at least one clock switch configured to control whether or not the clock is supplied from the clock circuit to the at least one logic circuit,
wherein the control circuit controls the clock circuit and the at least clock switch, and
wherein the control circuit changes the voltage of the operating power and the voltage of the substrate power, based on a state of whether the first power supply switches and the at least one clock switch are in the supplying state or the blocking state.

6. The circuit system according to claim 1, further comprising:
a temperature sensor configured to detect a temperature of the circuit system,
wherein the control circuit changes the voltage of the operating power to be supplied by the power supply circuit and the voltage of the substrate power to be supplied by the power supply circuit, based on the temperature detected by the temperature sensor and a state of whether the first power supply switches are in the supplying state or the blocking state.

7. The circuit system according to claim 5, further comprising:
a temperature sensor configured to detect a temperature of the circuit system,
wherein the control circuit changes the voltage of the operating power to be supplied by the power supply circuit and the voltage of the substrate power to be supplied by the power supply circuit, based on the temperature detected by the temperature sensor and the state of whether the first power supply switches and the at least one clock switch are in the supplying state or the blocking state.

8. The circuit system according to claim 3,
wherein the control circuit changes the voltage of the operating power to be supplied by the power supply circuit and the voltage of the substrate power to be supplied by the power supply circuit, based on a frequency of the clock supplied by the clock circuit and a state of whether the first power supply switches are in the supplying state or the blocking state.

9. The circuit system according to claim 7,
wherein the control circuit changes the voltage of the operating power to be supplied by the power supply circuit and the voltage of the substrate power to be supplied by the power supply circuit, based on the temperature detected by the temperature sensor, a frequency of the clock supplied by the clock circuit, and the state of whether the first power supply switches and the at least one clock switch are in the supplying state or the blocking state.

10. A semiconductor device comprising:
a plurality of memory blocks;
a power supply circuit configured to supply operating power and substrate power to the plurality of memory blocks;
a plurality of first power supply switches configured to control whether or not the operating power is supplied from the power supply circuit to the plurality of memory blocks; and
a control circuit configured to control the power supply circuit and the plurality of first power supply switches,
wherein the control circuit changes a voltage of the operating power to be supplied by the power supply circuit and a voltage of the substrate power to be supplied by the power supply circuit, based on a state of whether each of the plurality of first power supply switches is in a supplying state or a blocking state.

* * * * *